M. MESTER.
ANIMAL TRAP.
APPLICATION FILED APR. 30, 1917.

1,242,462.

Patented Oct. 9, 1917.

Inventor
M. Mester

By N. M. Wilson
Attorney

UNITED STATES PATENT OFFICE.

MICHAEL MESTER, OF CHICAGO, ILLINOIS.

ANIMAL-TRAP.

1,242,462.  Specification of Letters Patent.  Patented Oct. 9, 1917.

Application filed April 30, 1917. Serial No. 165,414.

*To all whom it may concern:*

Be it known that I, MICHAEL MESTER, a subject of the King of Hungary, residing at Chicago, in the county of Cook and State of Illinois, have invented certain new and useful Improvements in Animal-Traps, of which the following is a specification.

This invention relates to certain new and useful improvements in animal traps.

The primary object of the invention is the provision of a trap adapted for catching animals of various sizes, arrangements being made whereby an animal may enter the trap either from the top or one side thereof being attracted by a bait, the weight of the animal acting to spring the trap for automatically closing the same and thereby imprisoning the animal therein.

A further object of the device is the provision of an animal trap having separate side and top doors adapted for tensioning in their open positions when the trap is set, the said doors automatically closing upon the springing of the trap by an animal entering the same.

With these general objects in view the device primarily consists of the provision of a trap having a spring operated side door and a gravity controlled top door both adapted to be opened when the trap is set, the said doors being automatically closed simultaneously, tripping mechanism being arranged for the doors easily actuated by an animal entering the trap attracted by the bait positioned therein.

In the drawing forming a part of this application and in which like numerals refer to corresponding parts throughout the several views.

Figure 1:
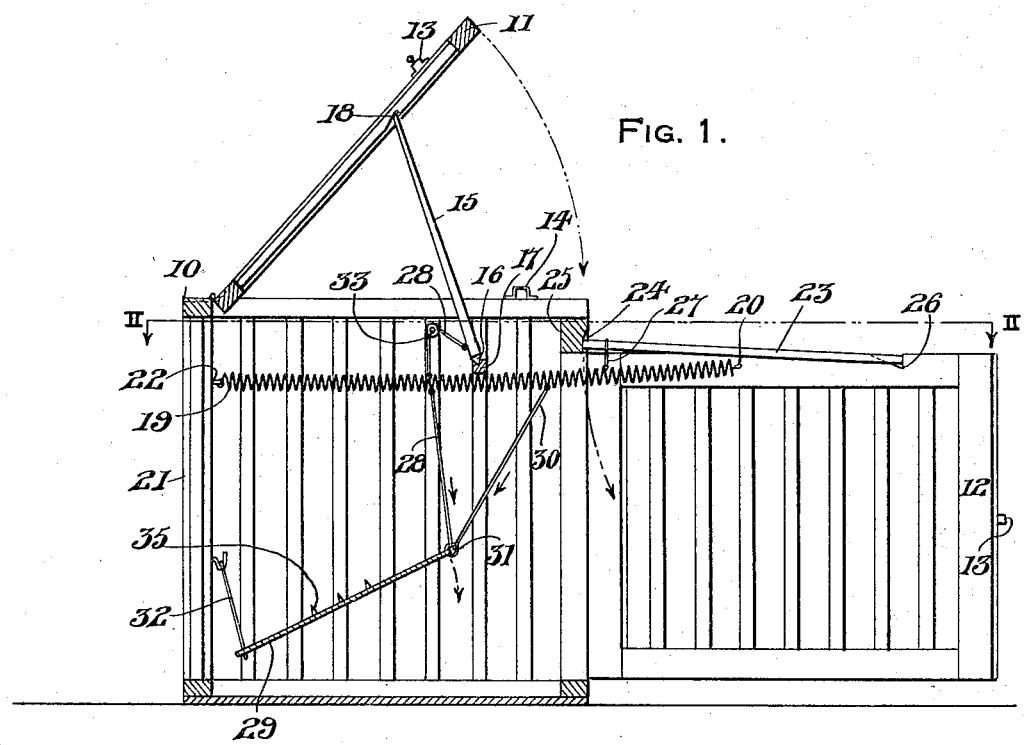
Figure 1 is a vertical sectional view through the device.
Figure 2:
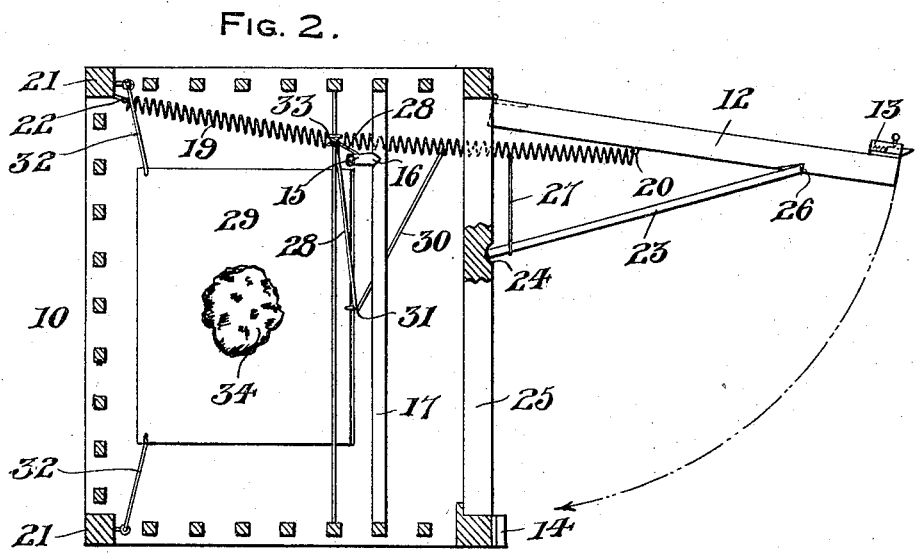
Fig. 2 is a horizontal view taken upon line II—II of Fig. 1.

The present trap provides a cage 10 which may be of any desired form such as rectangular in cross section as herein illustrated, the same having a hinged top door or section 11 and a hinged side door or section 12, each of the said doors having a spring catch 13 for engaging a suitable positioned keeper 14 when the doors are closed.

The door 11 is adapted to close by the force of gravity and is placed in its set position by means of a strut 15 adapted for seating within a notch 16 of a cross piece or brace 17 of the cage 10 and a socket 18 in the lower face of the door 11. The side door 12 is adapted for closing by a coil spring 19 connected between the said door as at 20 and one of the rear posts 21 of the cage as at 22. A strut 23 is adapted to maintain the door 12 in its open position when the trap is set, said strut being at such times seated within a notch 24 in the front side 25 of the cage 10 and a socket 26 in the upper portion of the door.

It will be understood from this description that the door 11 is maintained open when desired by the strut 15 while the door 12 is maintained open by the strut 23, it being obvious that upon removing the strut 15, the top door 11 will fall of its own weight to its closed position while upon removing the strut 23 the spring 19 will forcibly close the door 12. When the doors are closed in this manner the catches 13 engage the keepers 14 for retaining the doors in their closed positions, it being apparent that by removing both the struts 15 and 23 at one time, the two doors will be automatically closed simultaneously.

A tripping mechanism for the struts consists of a cord 27 connecting the strut 23 with the spring 19 and a similar cord 28 connecting the strut 15 with the spring 19 while a bait receiving platform 29 is suspended within the cage 10 by a cord 30 having its ends attached to the spring 19 and its intermediate portion freely positioned from a ring 31 carried by one edge of the platform, the rear corners of the platform being suspendingly connected to the rear posts 21 by means of flexible connections 32.

The cord 28 may be arranged over a suitably positioned pulley 33 if desired while any form of bait 34 may be attached to the platform 29 by means of prongs 35.

The setting of the trap by positioning the doors 11 and 12 open by means of the struts 15 and 23 has been fully set forth and it will be understood that an animal entering the cage 10 either through the open top or front side thereof may attempt to remove the bait 24 and upon exerting a small amount of force upon the platform 29 or by positioning of the animal thereon, the cord 30 will draw downwardly upon the spring 19 which will pull the cords 27 and 28, thereby releasing the struts 15 and 23 from the notches 16 and 24 respectively. The doors 11 and 12 being thus released, the same will automatically close imprisoning the animal within the cage 10 and retaining it captive until one of the catches 13 is released. A trap may be formed of any desirable material and minor changes may be made without departing from the spirit and scope of my invention as claimed.

What I claim is new is:—

A trap comprising a cage having a hinged top door and a hinged side door, retaining catches for the said doors when closed, a transverse brace within the cage having a notch in its upper side, a strut seated within the said notch engaging the top door when the trap is set, a further strut positioned between the front side of the cage and the said side door when the trap is set, a tensioning closure spring for the said side door connecting the latter with the rear portion of the cage, flexible connections between the said spring and the adjacent portions of said struts, a bait carrying platform suspendingly attached to the rear portion of the cage and to the said spring.

In testimony whereof I affix my signature.

MICHAEL MESTER.